United States Patent [19]

Hock et al.

[11] Patent Number: 5,480,931

[45] Date of Patent: Jan. 2, 1996

[54] PLASTIC CASTINGS HAVING FILLER AND FLAKEY PARTICLES DISPERSED IN A POLYMER MATRIX TO IMPROVE SCRATCH RESISTANCE

[75] Inventors: Klaus Hock, Regen; Lothar Frank, deceased, late of Plüderhausen, by Brigitte Frank, legal representative; Friedrich Schock, Sr., Schorndorf, all of Germany

[73] Assignee: Schock & Co. GmbH, Schorndorf, Germany

[21] Appl. No.: 806,658

[22] Filed: Dec. 13, 1991

[30] Foreign Application Priority Data

Dec. 19, 1990 [DE] Germany .......................... 40 40 602.4

[51] Int. Cl.⁶ ................................ C08J 5/10; C08K 3/34; C08L 33/00
[52] U.S. Cl. .......................................................... 524/449
[58] Field of Search ................................................ 524/449

[56] References Cited

U.S. PATENT DOCUMENTS

| | | | |
|---|---|---|---|
| 3,488,246 | 1/1970 | Duggins et al. | 161/19 |
| 4,756,951 | 7/1988 | Wang et al. | 428/204 |
| 4,863,782 | 9/1989 | Wang et al. | 428/204 |

FOREIGN PATENT DOCUMENTS 1493393  11/1977  United Kingdom .

OTHER PUBLICATIONS

Iriodin for Plastics, E. Merck, pp. 3–14. Jul. 18, 1990.

*Primary Examiner*—Paul R. Michl
*Assistant Examiner*—U. K. Rajguru
*Attorney, Agent, or Firm*—Edward J. Timmer

[57] ABSTRACT

In order to make plastic castings which are filled to a high degree easier to care for, it is proposed that a further component consisting of a flake-shaped material in the matrix be arranged at least in the area of the surface of the casting.

26 Claims, 1 Drawing Sheet

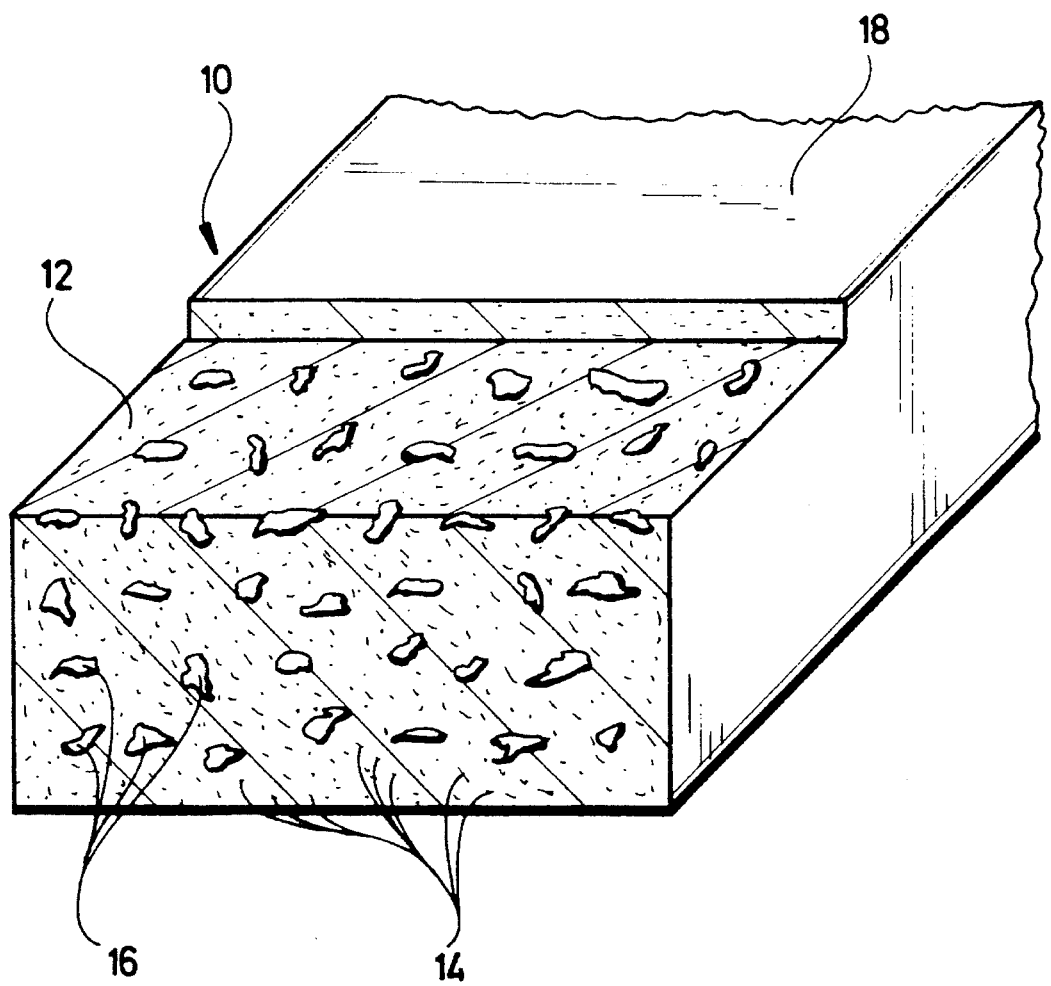

PLASTIC CASTINGS HAVING FILLER AND FLAKEY PARTICLES DISPERSED IN A POLYMER MATRIX TO IMPROVE SCRATCH RESISTANCE

The invention relates to plastic castings with an inorganic polymer matrix which is filled with a particle-shaped inorganic filler.

Such plastic castings are widely used, for example, as worktops and kitchen sinks, in sanitary facilities, etc.

In the present case, plastic castings are to include in addition to the castings mentioned hereinabove a simple plate provided for further processing, for example, for kitchen furniture. Plastic castings may similarly include all kinds of terminating strips or decorative strips.

The plastic castings known from the prior art often comprise a polymer matrix made of polyester or polyacrylic resins, and aside from quartz powder, quartz sand, cristobalite powder, cristobalite sand, aluminum oxide powder in the form of aluminum trihydroxide is also used as particle-shaped inorganic fillers.

All these plastic castings, particularly the dyed plastic castings, have the disadvantage that scratches remain visible as bright to white marks and stains caused, in particular by liquids which stain very intensively such as coffee, tea, fruit juices, etc., are very difficult to remove. Even if the stains can be removed, clearly visible scratch marks still remain from the scouring agents which are used.

The object of the invention is to make plastic castings easier to care for, i.e., in particular to facilitate the cleaning and make the parts less sensitive to scratches.

This object is accomplished in accordance with the invention with the plastic castings described at the beginning by the matrix containing a further component consisting of a flake-shaped material at least in the surface area of the casting.

Flake-shaped material in connection with the present invention is to be understood-as flat particles in the form of small, thin flakes which in one plane have a relatively large diameter and a relatively smooth surface and perpendicular to this plane have a comparatively small thickness. The flake-shaped material is preferably transparent.

Surprisingly, it was found that plastic castings according to the invention containing a flake-shaped component in at least the surface area are considerably easier to clean and even if scouring agents are used for cleaning at most scratch marks which are barely visible appear on the castings.

The flake-shaped material is preferably of inorganic origin. In particular mica, kaolin, flake-shaped quartz (from quartz with a leaf or sheet structure), glass flakes and metal flakes or spangles are suited for it.

When the plastic castings are used for kitchen and sanitary facilities, it is important that a possible water absorption by the flake-shaped material when exposed to water or steam under the environmental conditions normally prevailing in kitchen and bathroom should not cause any significant lightening of these.

The mica particles which are suited as flake-shaped material are annealed to reduce their capability of absorbing water before they are added to a mixture for the manufacture of the plastic castings.

In addition or as an alternative to the thermal pretreatment, the capability to absorb water can be drastically reduced by a type of sealing. For example, mica flakes can be coated with $TiO_2$ and sealed against absorbing water. A polycrystalline coating is adequate. Silicon compounds are also suitable for sealing the flakes.

As an alternative to or in combination with the mica particles, scale-like glass particles can likewise be used as flake-shaped material. The choice for the flake-shaped material is—as shown hereinabove—not limited to the mica particles and the scale-like glass particles, but these are components which are relatively easily accessible and obtainable for reproduction in their material characteristics.

Particularly good surface characteristics are obtained when the particles of the flake-shaped material are arranged with a preferential orientation which extends parallel to the surface of the casting. This results in a particularly smooth surface of the casting, and this smoothness can also be felt. The cleaning involves considerably less effort, i.e., the sensitivity to staining is thereby drastically reduced.

The preferential orientation of the flake-shaped material parallel to the surface of the plastic casting is obtained in a particularly simple way by the diameter of the particles of the flake-shaped material being on average greater than or equal to 30 µm in one plane. In this case, it is possible to impose a preferential orientation on the particles in the matrix in a relatively simple way.

The thickness of the particles of the flake-shaped material can be varied within relatively wide ranges, but should preferably be 0.5 µm or less.

The ratio of the thickness of the particles to the diameter is important for the degree of orientation or the preferential orientation of the particles of the flake-shaped material, and on average this ratio of thickness to diameter is chosen smaller than or equal to 0.1, preferably 0.02.

Furthermore, attention is to be paid to the ratio of the particle size of the particle-shaped filler and the diameter of the flake-shaped particles in the preferential plane, with the ratio of the flake diameter to the average particle size preferably being selected as 1:2 to 1:1. For example, flake fractions whose diameter is from 30 µm to 200 µm harmonize particularly well with particles whose average size is 100 to 200 µm.

If the flake diameter is chosen too small in relation to the particle size, the flakes often accumulate at the surface of the particles or in a neighboring area with the result that these are then no longer available in the plastic matrix between the filler particles and at the surface of the casting.

Therefore, it is generally held that with coarser filler particles, improved cleaning ease is achieved when the average diameter of the flake-shaped material is also increased. It is preferable to choose an average flake diameter which is approximately equal to or greater than the average diameter of the filler particles.

The amount of flake-shaped material added to the casting substance used for the manufacture of the plastic castings should not be less than 0.3% by weight (in relation to the casting substance) as there is no significant effect to be achieved with distinctly smaller components. With such an added quantity, approximately 10% of the surface area of the casting will be taken up by mica flakes.

In particular, when larger quantities of flake-shaped material are added to the casting substance, these may serve as substitute for part of the inorganic filler.

There will be an upper limit of approximately 10% by weight for the component of the flake-shaped material (in relation to the casting substance) as the flake-shaped material is, as a rule, more expensive than the particle-shaped, inorganic filler. Increasing components of the flake-shaped material do not produce any further noticeable improvement in the sensitivity to scratches and cleaning ease. High components can even result in mutual obstruction of the flakes in their alignment with partial loss of the advantages again. While no substantial increase in the viscosity of the final mixture is to be observed in the preferred area of the flake component owing to the addition of the flake-shaped component, there is a significant rise in the viscosity when the component is too high.

A preferred range for the component of the flake-shaped material in the casting substance lies between approximately 0.5 and 4% by weight.

A particularly high degree of insensitivity to scratches is achieved by selecting the flake-shaped material such that it has an index of refraction which is adapted to the index of refraction of the polymer matrix, i.e., by the indexes of refraction of the flake-shaped material and the polymer matrix being approximately identical. With such castings, scratch marks are particularly inconspicuous.

Surprisingly, a mica material which is known as subtractive dye from other uses can also be employed as flake-shaped material. The Merck company of Darmstadt, Germany, sells dyes of this type under the trademark IRIODIN. Herein mica particles are coated over their entire surface with further layers of bismuth oxide, titanium oxide, iron oxide, etc., whereby the substractive color effect is achieved by the reflection of the light on various surfaces.

Use of these IRIODIN dyes makes the use of additional pigments superfluous and at the same time achieves the same effect as the flake-shaped material described hereinabove with an improvement in the ease with which the plastic castings are to be cared for and in their resistance to scouring.

Acrylic resin plates dyed with subtractive dyes have been manufactured in the past, but the addition of such flake-shaped materials as dyes to filled plastic castings is unknown, in particular, presumably also because the manufacturer of the so-called IRIODIN dyes recommends in its data sheets even the avoidance of pyrogenic silicic acid for making the dyed substances thixotropic because minimal amounts of fillers reduce the color effect.

Use of the IRIODIN dyes is also known in so-called metallic paints as well as in gel coat processes. Additions of IRIODIN pigment usually lie in the range of 10 to 25%.

Surprisingly, it has been shown that contrary to the indication given by the manufacturer of the IRIODIN dyes regarding processing, a very good color effect is achieved with the subtractive dyes on mica basis when these are used as coloring component in filled plastics.

Use of these dyes in the plastic castings according to the invention results in a particularly deep tint with the interesting additional optical effects peculiar to the IRIODIN dyes.

The positive effect is also achieved with plastic castings which are filled to a high degree, i.e., in which the component of the inorganic filler is approximately 50 to 80% by weight (in relation to the casting substance). The so-called IRIODIN dyes also develop their effect with these plastic castings.

Quartz powder, quartz sand, cristobalite sand, $Al(OH)_3$ or cristobalite powder are preferred as inorganic filler.

A wide range of different plastics is suitable as polymer component for formation of the matrix, in particular polyester, polyacrylic and vinyl ester resins, as well as polyurethane and epoxy resins. The type of reaction occurring during the formation of the polymers is not of decisive importance.

In comparison with castings in which the plastic matrix does not contain the flake-shaped component, the castings according to the invention exhibit a significantly improved resistance to cracks in the usual hot-cold tests. Whereas with conventional castings, for example, kitchen sinks, alternate rinsing of the casting with hot and cold water results in the formation of micro cracks which in the course of time result in leakage of the kitchen sink, in the kitchen sinks according to the invention the micro cracks can only form as far as the flake-shaped particles in the polymer matrix. The micro cracks end at the surface of the flake-shaped particles and cannot spread into deeper areas of the matrix of the casting. Consequently, the kitchen sinks according to the invention exhibit increased resistance to cracks.

The invention also relates to a method for the manufacture of plastic castings from a monomer syrup which may contain prepolymers and to which an inorganic filler is added, wherein this mixture is fed into a casting mold and cured. Such a method is standard for the manufacture of plastic castings of the kind described hereinabove and is employed in many variations.

To produce castings with the improved possibility according to the invention of caring for and, in particular, with the improved possibility of cleaning these and with the improved insensitivity to scratches, it is necessary to depart from the hitherto known methods. Therefore, a further object of the invention is to propose an appropriate method.

This object is accomplished by a component consisting of flake-shaped material being added to the syrup before it is fed into the mold and by the thereby obtained dispersion being fed into the mold in such a way that a preferential orientation approximately parallel to the surface of the plastic castings is achieved for the arrangement of the particles of flake-shaped material in the polymer matrix which forms during the curing. Herein the conditions are to be selected such that, as far as possible, the shearing force between mold surface and dispersion always has essentially the same orientation, and as far as possible, a maximum of shearing force occurs.

A syrup whose viscosity is from 60 to 200 cp is preferably used in such methods. The lower limit value of this range ensures that a sufficient degree of orientation of the flakes is achievable in the polymer matrix, while the upper limit value is predetermined by the fact that with higher viscosities, feeding of the syrup or the casting substance into the mold becomes difficult. The preferred range of the viscosity of the syrup, i.e., of the liquid component of the mixture still without the inorganic fillers and without the inorganic flake-shaped material, is 80 to 180 cp.

The optimum viscosity of the syrup is preferably set by the addition of different proportions of the prepolymer. The proportion of the added prepolymer is, of course, dependent on the chain length of the prepolymer. However, known inorganic and organic thixotropy agents can also be used.

When choosing the range of the viscosity of the syrup, it should be noted that depending on the shape and particle size of the flake-shaped material, a lower viscosity may prove adequate for alignment of the particles in a preferential orientation. If, for example, relatively large, flat particles make up the major part of the flake-shaped material, a lower viscosity of the syrup is adequate to obtain a necessary degree of orientation of the particles parallel to the surface of the plastic casting.

If, on the other hand, smaller particles are used or particles with an unfavorable ratio of diameter and thickness of the particles, then it is recommendable to use a syrup with a higher viscosity.

In this way the inventive method for manufacturing the new plastic castings can be adapted to different system configurations and/or characteristics of the casting molds.

A standard processing viscosity of the final casting substance lies in the range of 3000 to 30000 cp, and the particle size of the inorganic filler can be up to 200 μm and the filler content up to 70% by weight.

The final casting substance is preferably poured into the mold at low mold temperatures (for example, approximately 50° C.). The higher viscosity of the casting substance at the comparatively lower temperature results in a good degree of orientation of the flake-shaped particles parallel to the mold surface on account of the shearing forces which then occur. After the mold has been filled, it is heated up relatively quickly to the curing temperature, for example, approximately 100° C., in order to start the polymerization process. The way in which the rest of the method is conducted does not differ substantially from the methods for manufacturing the conventional castings.

These and further advantages of the invention will be explained in greater detail with reference to the drawing which shows an enlarged, schematic sectional view through a plastic casting in the form of a plate.

The figure is a perspective view, partially in section, of a plastic casting in accordance with the invention.

A plastic casting in the form of a plate 10 is shown in the figure. The plate comprises a plastic matrix 12 consisting of polyacrylic resin which is filled to a high degree with quartz or cristobalite powder (particles 14).

The plastic matrix 12 contains a flake-shaped material 16 as additional component. This may be, for example, mica or a subtractive dye manufactured on the basis of mica. As is evident from the schematic representation in the figure, the flakes 16 are arranged with a preferential orientation within the plastic matrix 12. The preferential orientation is essentially parallel to the surface 18 of the plate 10.

The degree of orientation shown in the figure is relatively high, i.e., when pouring the substance into a corresponding mold, optimum adaptation of the viscosity of the syrup to the mold and the particle size of the flake-shaped material 16 was achieved. With such high degrees of orientation of the flake-shaped material 16, cleaning is possible with particular ease and there is a particularly high insensitivity to scouring.

It should also be noted that the index of refraction of the flakes 16 is essentially adapted to the polyacrylic matrix, i.e., the index of refraction of the polyacrylic matrix (PMMA) is 1.492, while the index of refraction of the mica flakes is approximately 1.5. The mica flakes should be at least thermally pretreated, and it is even better for them to be additionally sealed against absorbing water.

The effect of the inventive composition of the plastic castings on the cleaning ease and resistance to scouring will be explained hereinbelow with reference to the examples:

The mixtures of the following examples are processed into plate material using conventional casting methods and subjected to a cleaning and a scouring test.

Cleaning Test

Circular marks 3 mm and 1 mm wide are drawn with a felt pen on the flat surface of the test object. After a drying period of 1 hour, the marks are gone over with a cleaning agent for plastic pots with a constant pressing force 200 times and 1000 times, respectively. The remaining traces of the marks are visually assessed and awarded grades 1 to 6. Grade 1 means complete removal of the felt pen marks, grade 6 indicates that hardly any cleaning effect was achieved.

Scouring Test

The test object is scratched with an unglazed ceramic object. The surface of the test object is cleaned with an abrasive cleaning agent. The appearance of the surface is visually assessed. Conventional materials show visible white scratches (grade 6). Grade 1 means that after cleaning with the abrasive agent, the scratch marks are no longer visible.

EXAMPLE 1

36 parts by weight polymer syrup (MMA/PMMA with approximately 20 weight % polymer component where MMA is methylmethacrylate and the PMMA is polymethylmethacrylate)

0.7 parts by weight of a standard cross-linking agent 0.5 parts by weight standard peroxide catalysts 60 parts by weight of a cristobalite powder as particle-shaped filler with a grain size distribution of 0 to 200 μm, mainly 30 μm to 40 μm 0.1 parts by weight of a hydrophobic silicic acid as thixotropizing agent 1.4 parts by weight of a standard mold lubricant, for example, stearic acid 1 part by weight of the IRIODIN dye "163 Flitterperl" with a particle size of 30 μm to 200 μm In addition, the color shades can be influenced by color pastes and, as a rule, their component in the mixture will be less than 0.1 parts by weight.

Cleaning test: Grade 1  Scouring test: Grade 1

EXAMPLE 2

In a composition otherwise identical to that of Example 1, the components polymer syrup and the particle-shaped filler are used as follows:

30 parts by weight MMA/PMMA syrup with approximately 20 weight % polymer component 68 parts by weight quartz powder with a particle size distribution of 100 to 200 μm Cleaning test: Grade 1  Scouring test: Grade 1

EXAMPLE 3

25.5 parts by weight syrup (as in Example 1)

0.5 parts by weight cross-linking agent 0.5 parts by weight peroxide catalyst 73.5 parts by weight quartz powder with the following 3 differently dyed main fractions:

50 parts by weight with a particle size of 0 to 400 μm 22 parts by weight with a particle size of 300 to 800 μm 1.5 parts by weight with a particle size of 100 to 200 μm 0.5 parts by weight of mold lubricant 0.5 parts by weight of the IRIODIN dye "163 Flitterperl" with a particle size of 30 μm to 200 μm Cleaning test: Grade 1  Scouring test: Grade 1

EXAMPLE 4

In the recipe for Example 1, the components of the flake-shaped material (IRIODIN dye "163 Flitterperl") are varied in the range of from 0.2 to 3.2 parts by weight. The results obtained in the cleaning and scouring tests are summarized in Table I.

TABLE I

| Parts by weight IRIODIN 163 | Scouring test | Cleaning test |
| --- | --- | --- |
| 0.2 | 2 | 5 |
| 0.4 | 1 | 4 |
| 0.8 | 1 | 2 |
| 1.6 | 1 | 1 |

TABLE I-continued

| Parts by weight IRIODIN 163 | Scouring test | Cleaning test |
| --- | --- | --- |
| 3.2 | 1 | 1 |

EXAMPLE 5

Under the same conditions as in Example 4, the tests are carried out on test material which differs from that used in Example 4 only in that the size of the flake-shaped material is ≧20 μm (IRIODIN "120 Rutil Glanzsatin"). The test results are compiled in Table II.

TABLE II

| Parts by weight IRIODIN 120 | Scouring test | Cleaning test |
| --- | --- | --- |
| 0.2 | 5 | 2 |
| 0.4 | 4 | 3 |
| 0.8 | 3 | 3 |
| 1.6 | 2 | 3 |
| 3.2 | 2 | 2 |

EXAMPLE 6

In this series of tests, compositions derived from the recipe for Example 1 are tested. The components and their proportions which differ from this are given in Tables IIIa and b in which the test results are also summarized.

TABLE III a

| Filler particle size cristobalite | Filler parts by weight | IRIODIN 163 parts by weight | Scouring test | Cleaning test |
| --- | --- | --- | --- | --- |
| 0 to 40 μm | 60 | 0 | 6 | 3 |
| 0 to 40 μm | 60 | 1 | 1 | 1 |
| 0 to 100 μm | 60 | 0 | 6 | 3 |
| 0 to 100 μm | 60 | 1 | 1 | 1 |
| 0 to 200 μm | 60 | 0 | 6 | 3 |
| 0 to 200 μm | 60 | 1 | 1 | 1 |

TABLE III b

| Filler particle size quartz | Filler parts by weight | IRIODIN 163 parts by weight | Scouring test | Cleaning test |
| --- | --- | --- | --- | --- |
| 100 to 200 μm | 70 | 0 | 6 | 1 |
| 100 to 200 μm | 70 | 1 | 1 | 1 |
| 100 to 800 μm | 75 | 0 | 1 | 5 |
| 100 to 800 μm | 75 | 1 | 1 | 2 |

The evaluation of the given examples shows that with the correct choice of the size of the flake-shaped particles in relation to the particle size of the inorganic filler, even with filler particle sizes which vary within wide ranges, very good results are obtained with respect to cleaning ease and resistance to scouring (cf. Examples 1 to 3).

The series of tests shown in Example 4 shows that with optimum choice of filler particle size and particle size of the flake-shaped material, even from proportions of approximately 0.5% by weight onwards, excellent scouring test values and cleaning test values are obtained. Table I also shows that from a proportion of approximately 1.6% by weight onwards, optimum values are achieved in the scouring and cleaning tests.

In Example 5, the influence of the particle size of the flake-shaped material on the cleaning ease and the resistance to scouring of the test objects is shown. Even with components of 3.2% by weight in the composition, very good scouring test and cleaning test values are not obtained. The reason for this is that a major part of the flake-shaped materials is not available at the surface of the test object but accumulates around filler particles. The series of tests in Example 5 (Table II) does, however, also show that even with such unfavorable conditions, a very clear improvement in the resistance to scouring and the cleaning ease is achievable when a correspondingly higher amount of the flake-shaped material is added.

Finally, in the series of tests of Example 6, test objects with different particle-shaped filler components and different filler particle sizes were compared with comparison test objects containing no flake-shaped material.

From this direct comparison the enormous influence which even 1% by weight of the flake-shaped material has on the resistance to scouring and the cleaning ease of the test objects is clear. This finding applies over a wide range of the filler particle sizes and also to a polymer matrix which is filled to a very high degree with inorganic filler particles.

In particular, a very good resistance to scouring and cleaning ease are only achieved when the flake-shaped component is added.

The present disclosure relates to the subject matter disclosed in German application No. P 40 40 602.4 of Dec. 19, 1990, the entire specification of which is incorporated herein by reference.

What is claimed is:

1. A plastic casting having an organic polymer matrix which includes a particle-shaped inorganic filler and a further component comprising flake-shaped particulate material dispersed with said filler in said matrix at least in a surface region of said casting in an amount effective to improve removal of visible scratching from a casting surface using an abrasive cleaning agent.

2. Plastic castings as defined in claim 1, characterized in that said flake-shaped material is inorganic.

3. Plastic castings as defined in claim 1, characterized in that the hardness of said flake-shaped material corresponds approximately to the hardness of said inorganic filler.

4. Plastic castings as defined in claim 1, characterized in that the average expanse of said flake-shaped material is greater than or equal to half of the average grain size of said particle-shaped filler.

5. Plastic castings as defined in claim 1, characterized in that when water or steam act on the surface of said castings, said flake-shaped material does not cause any significant lightening of the color on said surface of said castings.

6. Plastic castings as defined in claim 2, characterized in that said flake-shaped material comprises mica particles which are annealed to reduce their capability of absorbing water.

7. Plastic castings as defined in claim 5, characterized in that said flake-shaped material is provided with a coating to reduce its capability of absorbing water.

8. Plastic castings as defined in claim 2, characterized in that said flake-shaped material comprises scale-like glass particles.

9. Plastic castings as defined in claim 1, characterized in that the diameter of said particles of said flake-shaped material in one plane is on average greater than or equal to 30 μm.

10. Plastic castings as defined in claim 1, characterized in that the thickness of said particles of said flake-shaped material is approximately 0.5 μm or less.

11. Plastic castings as defined in claim 1, characterized in that the ratio of the thickness to the expanse of said particles of said flake-shaped material is on average less than or equal to 0.02.

12. Plastic castings as defined in claim 1, characterized in that the component of said flake-shaped material is greater than or equal to 0.3% by weight in relation to the casting substance.

13. Plastic castings as defined in claim 1, characterized in that the component of said flake-shaped material is less than or equal to 10% by weight in relation to the casting substance.

14. Plastic castings as defined in claim 13, characterized in that the component of said flake-shaped material lies in the range of approximately 0.5 to 4% by weight in relation to the casting substance.

15. Plastic castings as defined in claim 11, characterized in that said flake-shaped material occupies in the finished casting approximately 10% or more of the surface area of said casting.

16. Plastic castings as defined in claim 1, characterized in that the index of refraction of said flake-shaped material is generally matched to the index of refraction of said polymer matrix.

17. Plastic castings as defined in claim 1, characterized in that the particles of said flake-shaped material are in the form of particles with a subtractive color effect.

18. Plastic castings as defined in claim 1, characterized in that the component of said inorganic filler is approximately 50 to 80% by weight in relation to said casting substance.

19. Plastic castings as defined in claim 1, characterized in that quartz powder, quartz sand, cristobalite powder or cristobalite sand is used alone or mixed as inorganic filler.

20. Plastic castings as defined in claim 1, characterized in that said flake-shaped material is arranged with a preferential orientation in said polymer matrix parallel to the surface of said casting.

21. Method for the manufacture of a plastic casting, comprising providing a monomer syrup which may contain prepolymers, forming a mixture comprising said syrup, an inorganic filler and flake-shaped particles with the flake-shaped particles add filler dispersed in said syrup, feeding this mixture into a casting mold in such a way as to obtain a preferential direction of said flake-shaped particles approximately parallel to a surface to be formed on said plastic casting and curing said mixture in said mola to form a polymer matrix about said filler and flake-shaped particles wherein the flake-shaped articles are present in said matrix in an amount effective to improve the removal of visible scratching from said surface using an abrasive cleaning agent.

22. Method as defined in claim 21, characterized in that the viscosity of said syrup is set at 60 to 200 cp.

23. Method as defined in claim 22, characterized in that the viscosity of said syrup is set at 80 to 180 cp.

24. Method as defined in claim 22, characterized in that the viscosity is set by means of the prepolymer content of said syrup.

25. Method as defined in claim 21, characterized in that the viscosity of said syrup is adapted to the shape and particle size of said flake-shaped material such that during the casting process the preferential orientation in the dispersion of the particles of said flake-shaped material is achieved by shearing forces which occur in the process.

26. Method as defined in claim 21, characterized in that the mixture containing said syrup, said inorganic filler and said flake-shaped material is fed into said mold in such a way as to already achieve at least partially a preferential orientation of the particles of said flake-shaped material in feeding means used for this purpose.

\* \* \* \* \*

UNITED STATES PATENT AND TRADEMARK OFFICE
CERTIFICATE OF CORRECTION

PATENT NO. : 5 480 931
DATED : January 2, 1996
INVENTOR(S) : Klaus HOCK, et al

It is certified that error appears in the above-indentified patent and that said Letters Patent is hereby corrected as shown below:

Column 10, line 6; replace "add" with ---and---.
          line 10; replace "mola" with ---mold---.

Signed and Sealed this

Twenty-third Day of July, 1996

Attest:

BRUCE LEHMAN

Attesting Officer      Commissioner of Patents and Trademarks